United States Patent [19]

Sigl

[11] Patent Number: 5,642,260

[45] Date of Patent: Jun. 24, 1997

[54] WELDING POWER SUPPLY HOUSING

[75] Inventor: Dennis R. Sigl, Appleton, Wis.

[73] Assignee: Illinois Tool Works Inc., Glenview, Ill.

[21] Appl. No.: 585,633

[22] Filed: Jan. 16, 1996

[51] Int. Cl.$^6$ .................................................. H05K 7/20
[52] U.S. Cl. ................................. 361/695; 174/16.1
[58] Field of Search .................... 174/16.1; 219/61.7,
219/76.11, 86.31, 125.1, 125.11, 126; 307/150;
361/679, 688–697, 704, 707–716, 724

[56] References Cited

U.S. PATENT DOCUMENTS

| | | | |
|---|---|---|---|
| 2,882,478 | 4/1959 | Hobart et al. | 174/16.1 |
| 3,253,646 | 5/1966 | Koltuniak et al. | 361/694 |
| 4,027,205 | 5/1977 | Frederick | 361/694 |

FOREIGN PATENT DOCUMENTS 3-268483  11/1991  Japan ..................................... 361/695

*Primary Examiner*—Gregory D. Thompson
*Attorney, Agent, or Firm*—Foley & Lardner

[57] ABSTRACT

A housing for a welding power supply, the housing including a main chamber and a tunnel through the main chamber, a number of electrical components mounted on the tunnel, a number of heat sinks mounted in the tunnel in operative engagement with said electrical components, a fan mounted in the tunnel for blowing air through said tunnel to cool the electrical components, an electrical control board and interconnect board mounted in the main chamber in a spaced relation to said tunnel to isolate the boards from the heat and air flow through the tunnel.

7 Claims, 6 Drawing Sheets

WELDING POWER SUPPLY HOUSING

FIELD OF THE INVENTION

The invention relates generally to a welding power supply housing and more particularly to a tunnel mounted in the housing for supporting the electrical components of the power supply, and a louvre mounted on each end of the supporting structure to allow for the flow of air through the tunnel.

BACKGROUND OF THE INVENTION

Welding power supply apparatus generally require a number of heat generating electrical apparatus such as transformers, power modules, inductors, rectifiers, transducers and the like interconnected through circuit boards. A fan is generally provided to circulate air throughout the structure to cool the heat generating apparatus. However air circulated through the housing includes dust which adversely affects the operation of the electrical system and more particularly, the printed circuit boards. In order to protect the circuit boards from contamination, plastic covers are often used to separately enclose the circuit boards.

SUMMARY OF THE PRESENT INVENTION

The present invention relates to a housing for a welding power supply apparatus having a wind tunnel extending through the housing to cool the various power devices and at the same time isolate the electrical circuit boards from dust and dirt. In this regard the wind tunnel is formed on the bottom of the housing between the front wall and the back wall by a pair of side walls and a top wall. Louvres are provided in the front wall and back wall in alignment with each end of the tunnel. A fan is provided on either end of the tunnel to direct air through the tunnel. The various heat generating power devices are mounted on the outside of aluminum heat sinks which are mounted to the inside of the top wall and side walls of the tunnel. Other heat generating components are mounted directly to the inside of the top wall and side walls and are cooled by the air passing through the tunnel. The printed circuit boards are isolated from the tunnel by support structure mounted on the top wall and side walls of the tunnel.

Other principal features and advantages of the invention will become apparent to those skilled in the art upon review of the following drawings, the detailed description and the appended claims.

Figure 1:
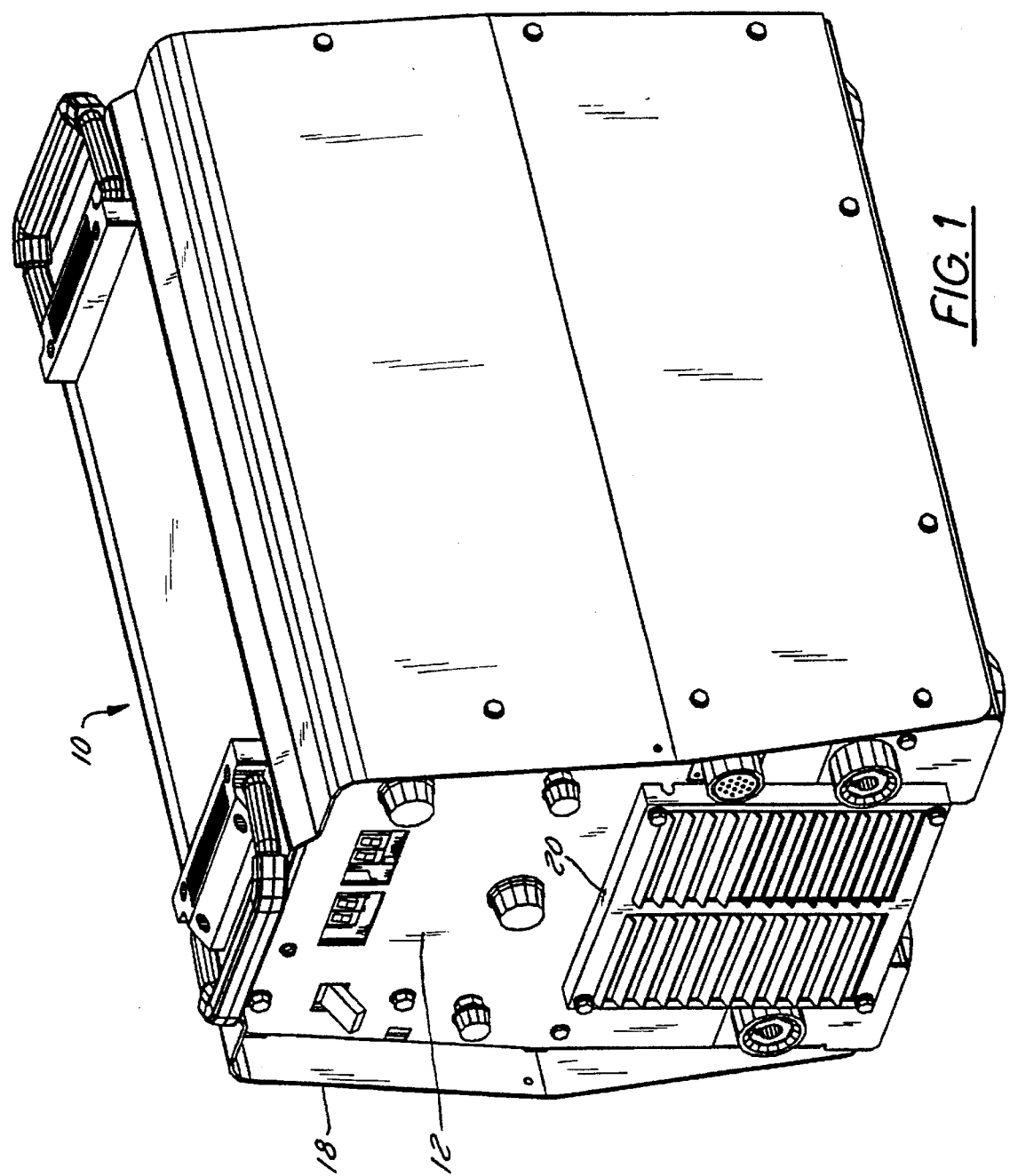
FIG. 1 is a perspective view of the welding power supply apparatus according to the present invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 3:
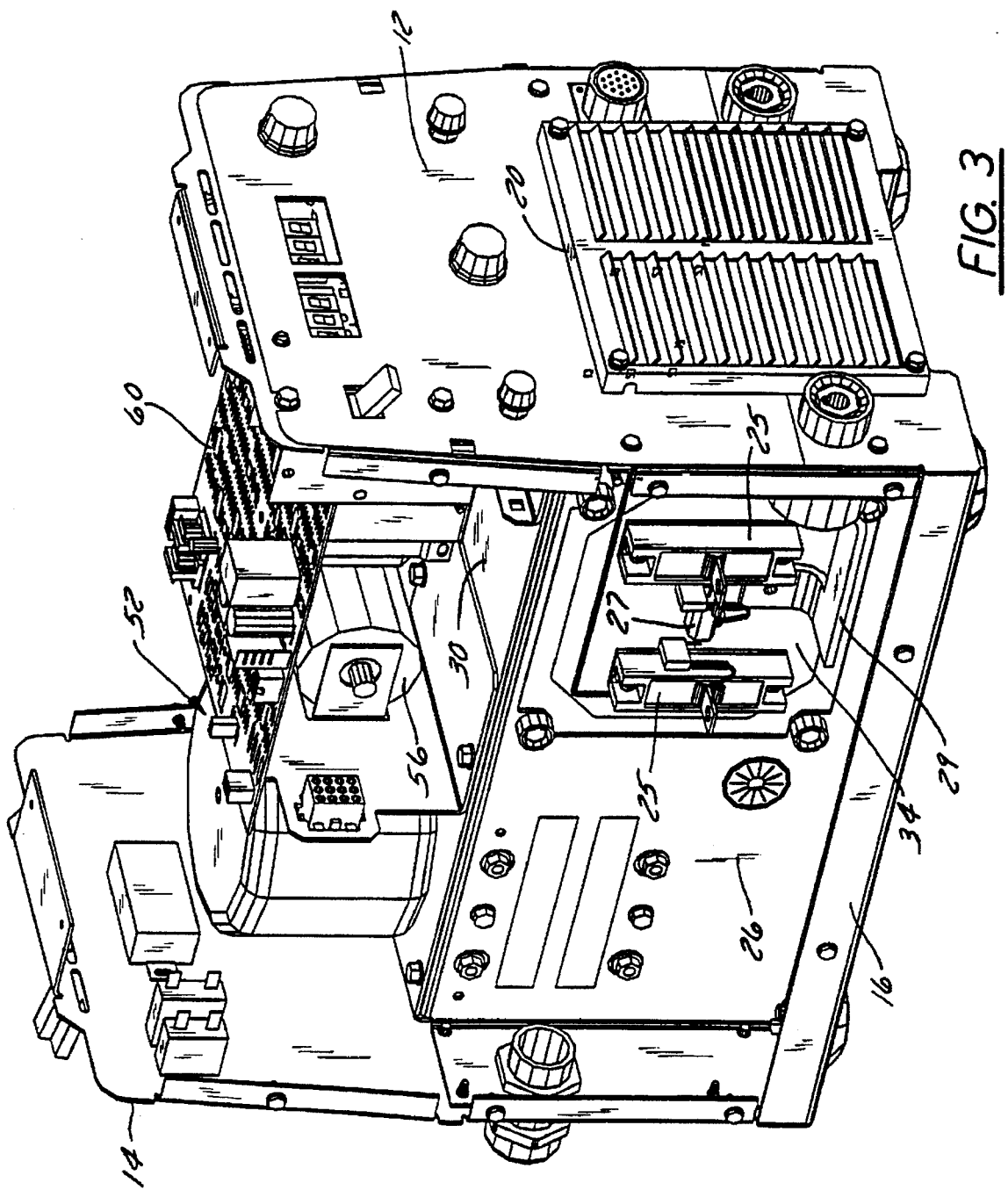
FIG. 3 is a view similar to FIG. 2 showing the electrical apparatus mounted on the left wall of the tunnel.

The welding supply apparatus 10 according to the present invention generally includes a front panel 12 and a back panel 14 interconnected by a base 16 and enclosed by a cover 18 as shown in FIG. 1. Each of the panels 12 and 14 are provided with louvres 20 and 22, respectively. A tunnel is formed between the panels 12 and 14 by a pair of side walls 26 and 28 and a top panel 30 which are aligned with the louvres 20 and 22 as shown in FIG. 3. A fan 23 may be located in alignment with the louvres 20 or 22.

Figure 4:
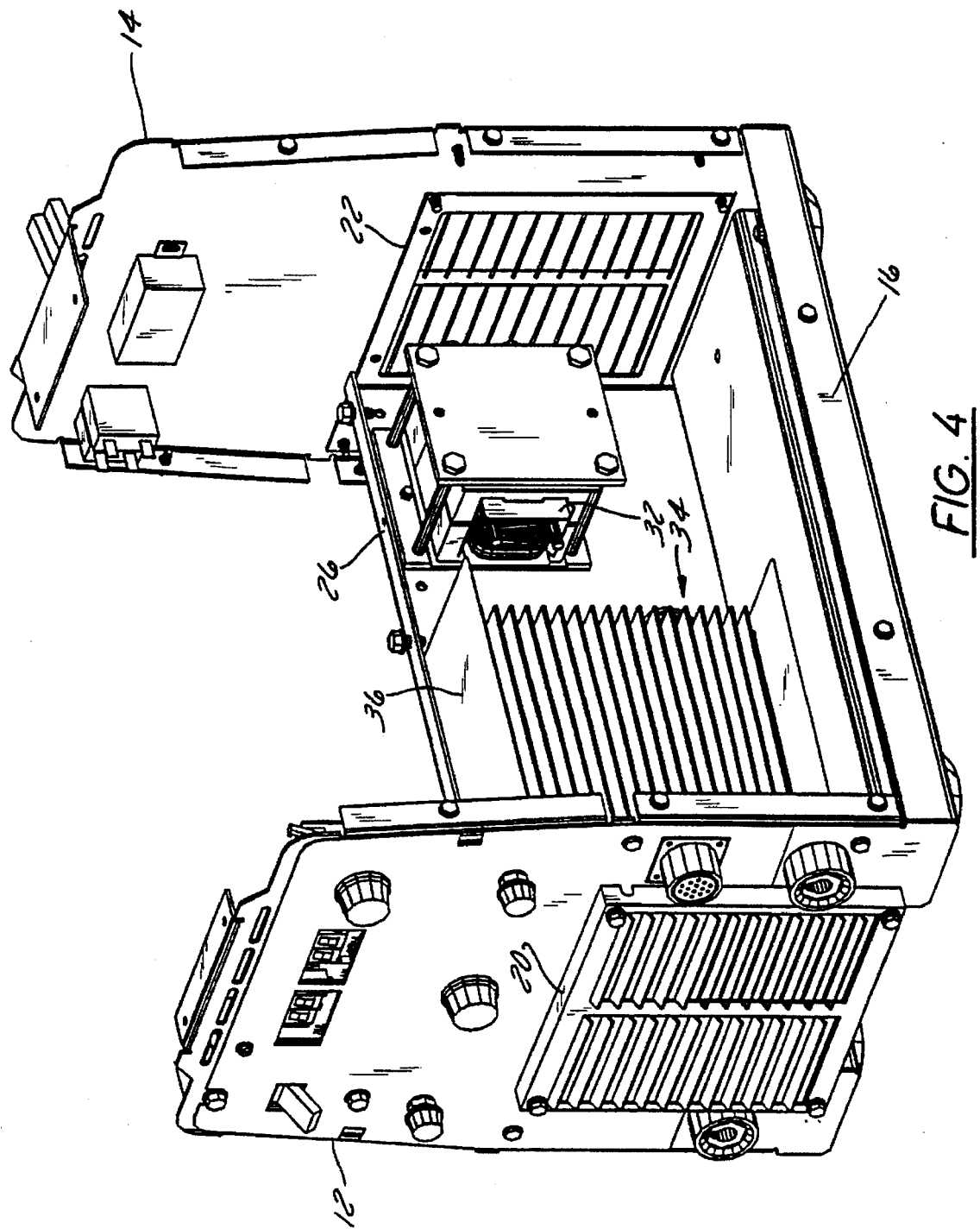
FIG. 4 is a perspective view of the right side of the apparatus with the cover and the top right side wall of the tunnel removed.

Referring to FIG. 4, a main high frequency transformer 32, a rectifier heat sink 34 and an output rectifier insulator 36 are shown mounted on the inside of wall 26. An output rectifier heat sink 34 is mounted on the inside of wall 26. A pair of output diodes 25, an RC snubber 27 and an output bus bar 29 are mounted on the outside of the output rectifier sink 34.

Figure 2:
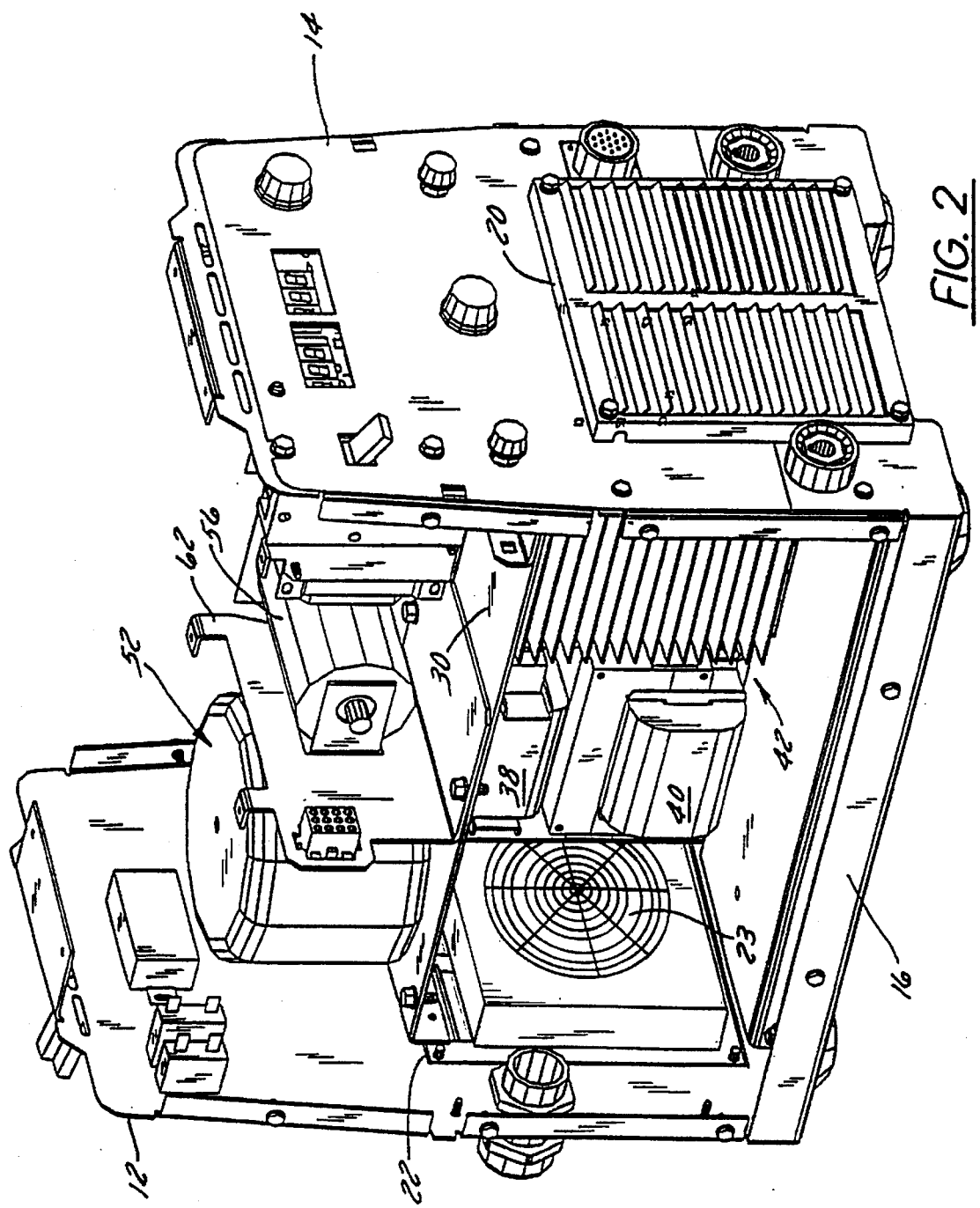
FIG. 2 is a perspective view of the left side of the apparatus with the cover and left side wall of the tunnel removed.
Figure 5:
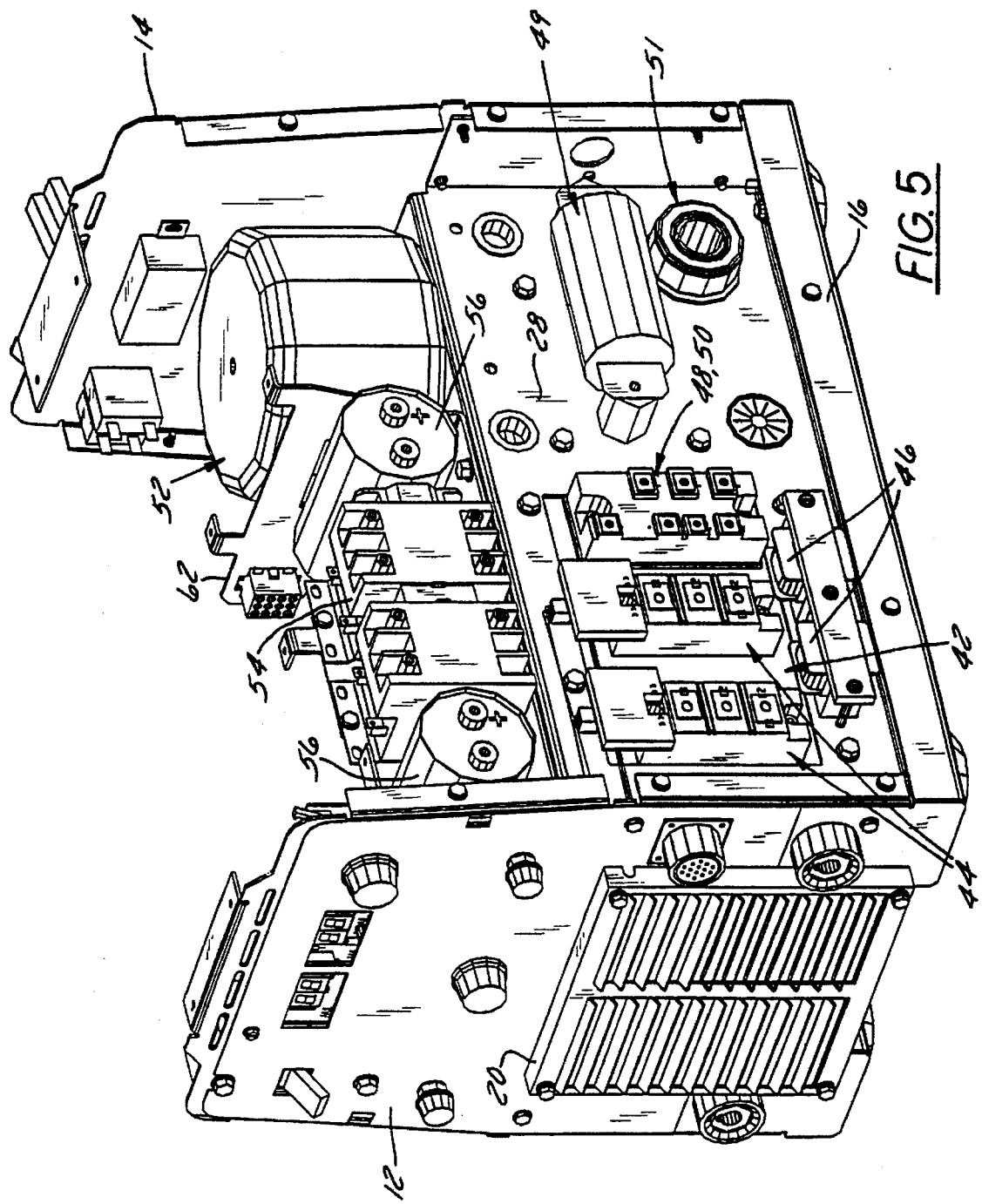
FIG. 5 is a view similar to FIG. 4 showing the top and right side walls with the electrical apparatus mounted thereon.

Referring to FIGS. 2 and 5 an input inductor 38, output stabilizer 40 and power module heat sink 42 are shown mounted on the inside of wall 28. It should be noted that the IGBT's 44, DI/DT inductors 46, input rectifier 48 and precharge SCR 50 are mounted on the outside surface of power module heat sink 42 which is mounted inside of side wall 28. A tank capacitor 49 and current transformer 51 are also mounted on side wall 28.

Auxiliary transformer 52, auto link contactor 54 and electrolytic capacitors 56 are mounted on the top panel 30. With this arrangement all of the elements are cooled by the air flow through the tunnel formed by the side walls 26 and 28.

Figure 6:
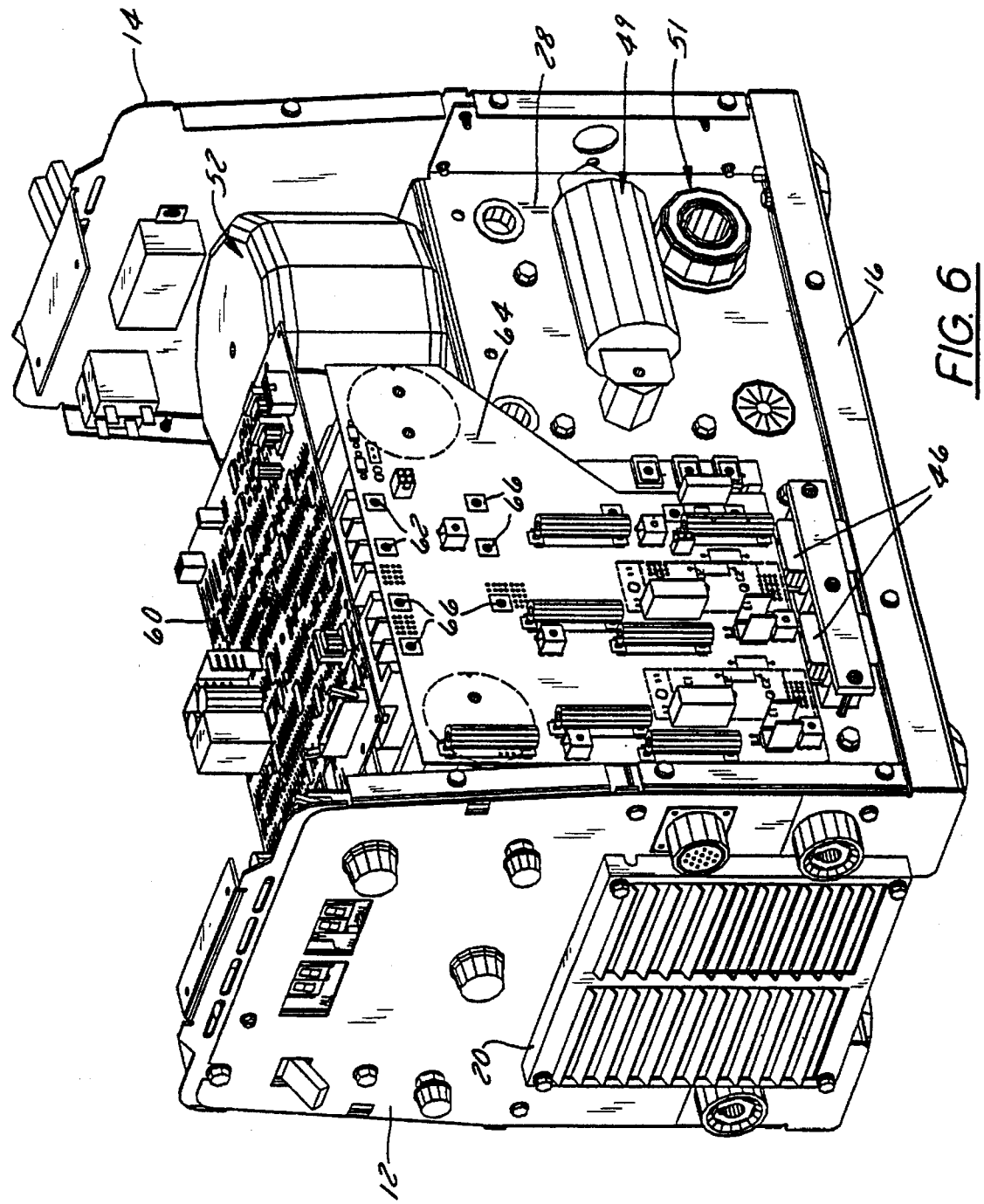
FIG. 6 is a view similar to FIG. 5 showing the main control board and interconnecting board mounted on the tunnel.

The main electrical circuit board 60 as shown in FIG. 6 is spaced from the top panel 30 of the tunnel by capacitor brackets 62 in a spaced relation to the auto link contactor 54. An interconnect board 64 is mounted on the side of the auto link contactor 54 by screws 66 in a spaced relation to the power module heat sink 42.

With this arrangement the heat generating components which are mounted on the side walls and top of the tunnel are cooled by the air flowing through the tunnel. The electrical circuit boards are mounted in a spaced relation from the tunnel and enclosed in the dead space between the end panels 12 and 14 cover 18 thus preventing dust from entering into the space between the cover 18 and the tunnel.

The preferred embodiment of the invention has been described above. Generally, a cooling wind tunnel (or chamber) for a welding power supply housing has been described. The tunnel of the preferred embodiment includes three walls distinct from the power supply housing, and one wall common with the power supply housing. The main chamber is vented to the outside for natural convection cooling in the preferred embodiment. The components that generate a relatively large amount of heat, such as transformer 32, inductor 38, stabilizer 42 are disposed within the wind tunnel. Electronic components such as diodes 25, IGBT's 44, snubber 27, input rectifier 48, and precharge SCR 50 are located outside the tunnel, mounted on a heat sink partially in the wind tunnel, that generate a relatively large amount of heat. Thus, the components that need a large amount of cooling are forced convection cooled, and the sensitive electronic components are protected from dust. Other embodiments come within the scope of the invention. One such alternative includes a different number of common walls. Another is using the wind tunnel in an induction heating power supply.

Thus, it should be apparent that there has been provided in accordance with the present invention a welding power supply housing that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A housing for a welding power supply, the housing including:

a main chamber defined by a base, an end panel mounted on each end of the base, and a cover enclosing the end panels, an inner chamber in the form of a tunnel formed between said end panels in the main chamber, one or more heat generating devices mounted on the tunnel, a louvre in each of said end panels aligned with the tunnel to allow air to flow through said tunnel to cool said heat generating devices and a main electrical control board and an interconnect board mounted in the main chamber in a spaced relation to said tunnel to isolate said boards from the air flow through the tunnel.

2. The housing according to claim 1 including a fan mounted in one end of said tunnel for blowing air through the tunnel.

3. The housing according to claim 2 including heat sensitive electronic components mounted on the tunnel in the main chamber and a number of heat sink mounted in the tunnel in thermal contact with the electronic components whereby air passing through the tunnel cools the heat sink to reduce the temperature of the electronic components.

4. A housing for an induction heating power supply, the housing including:

a main chamber defined by a base, two end panels and a cover mounted on the base and enclosing the end panels, an inner chamber in the form of a tunnel positioned between said end panels, one or more heat generating devices mounted on the tunnel, a heat sink mounted in the tunnel in thermal contact with one or more of the heat generating devices, a louvre in each of said end panels aligned with the tunnel to allow air to flow through said tunnel, and a fan mounted in one end of the tunnel to blow air through the tunnel to cool the heat sink.

5. The housing according to claim 4 including a main electrical control board and an interconnect board mounted in the main chamber in a spaced relation to said tunnel to isolate said boards from the heat and air flow through the tunnel.

6. An induction heating power supply apparatus comprising:

a housing for enclosing a number of heat generating electrical components and a number of heat sensitive electrical control boards mounted in said housing in a spaced relation to said heat generating electrical components, a tunnel mounted in said housing for supporting said heat generating components, a heat sink mounted in said tunnel and operatively connected to said heat generating electrical components, and a fan mounted in one end of said tunnel for blowing air through the tunnel to cool the heat sink.

7. The apparatus according to claim 6 wherein said housing includes a louvre on each end of said tunnel for admitting air into one end of the tunnel and discharging air from the other end of the tunnel.

* * * * *